United States Patent

Lazarus

[11] 3,874,775

[45] Apr. 1, 1975

[54] SPECTACLE FRAME WITH TEMPLES ANGULARLY ADJUSTABLE WHILE SPECTACLE FRAME IS WORN ON HEAD

[76] Inventor: Harry J. Lazarus, 36 Knox Ln., Englishtown, N.J. 07726

[22] Filed: June 1, 1973

[21] Appl. No.: 366,202

[52] U.S. Cl.................. 351/41, 351/111, 351/113, 351/158
[51] Int. Cl.............................................. G02c 5/04
[58] Field of Search .......... 351/111, 113, 121, 123, 351/132, 136, 141, 41, 158, 29

[56] References Cited
UNITED STATES PATENTS

| | | | |
|---|---|---|---|
| 2,026,723 | 1/1936 | Wollensak | 351/113 |
| 2,267,288 | 12/1941 | Rooke | 351/132 X |
| 2,756,632 | 7/1956 | Parsell | 351/121 |
| 3,565,517 | 2/1971 | Gitlin et al. | 351/138 X |
| 3,687,527 | 8/1972 | Blaine | 351/29 X |
| 3,759,608 | 9/1973 | McVeigh | 351/113 |

Primary Examiner—Paul A. Sacher
Attorney, Agent, or Firm—McGlew and Tuttle

[57] ABSTRACT

A spectacle frame includes a frontal lens support including a nosebridge, a pair of temples, and hinges connecting each temple to a respective outer end of the lens support. Adjustment means, accessible externally of the spectacle frame while the latter is being worn on the head, are interengaged between the temples and the lens support and operable to adjust and set the temples angularly about the axes of the associated hinges to adjust the pressures of the temples against the head. The adjustment means may comprise threaded members threadedly engaged in one of the frontal lens support or the temple, and abutting the other thereof, the threaded members being provided with suitable operating means such as, for example, a sharply knurled knob operable with only one finger. The adjustment means may also comprise a spring-biased rack member which is locked in adjusted position by a pointed screw having a knurled head, threaded into a temple having a bore or the like receiving the rack. A cushion or cushions of foam rubber or the like are provided on the nose bridge of the lens support to engage the wearer's nose.

20 Claims, 36 Drawing Figures

FIG. 1
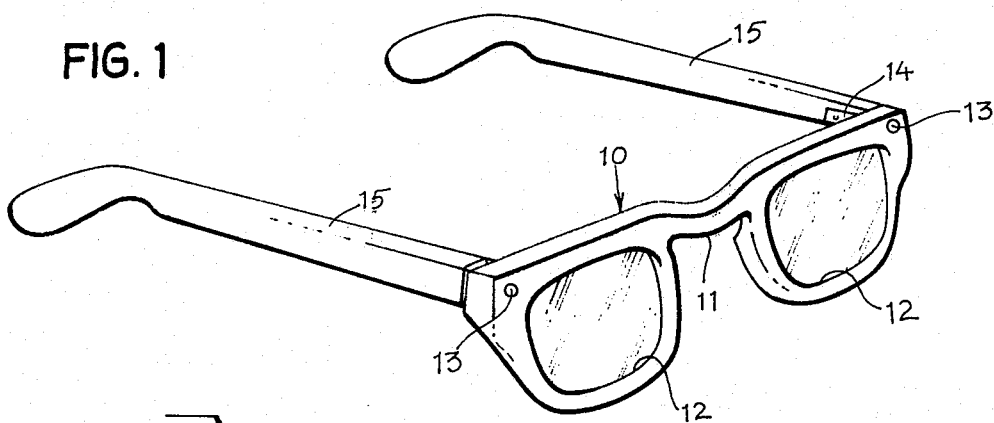
FIG. 2
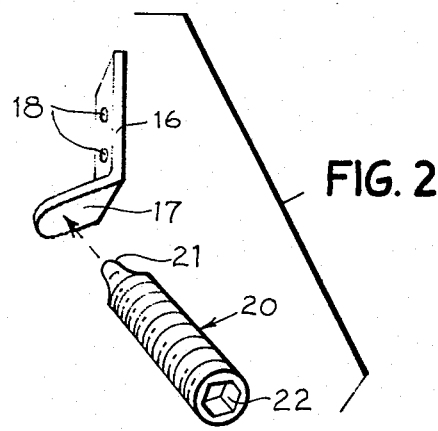
FIG. 3
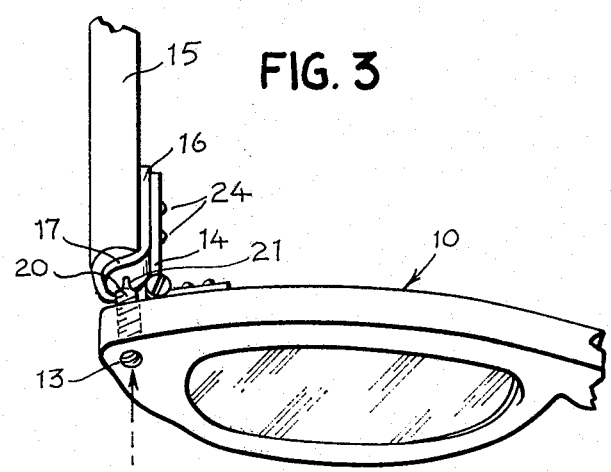
FIG. 4
FIG. 5
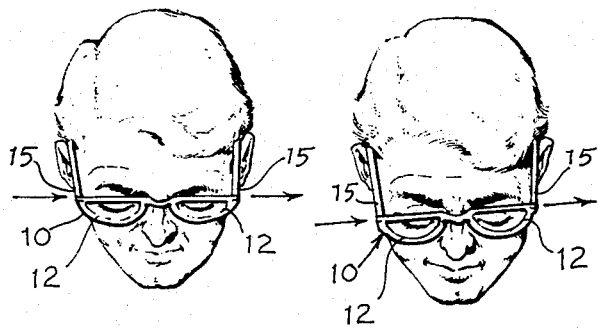
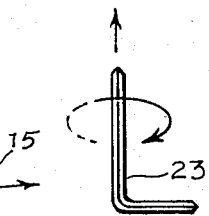
FIG. 6
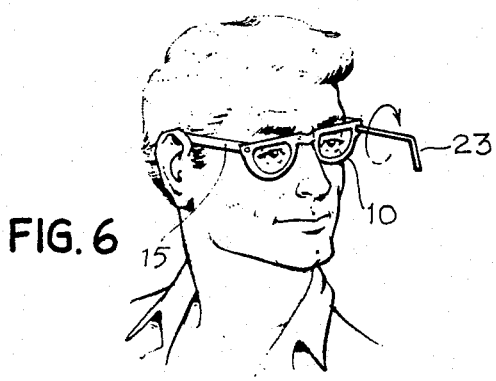
FIG. 7
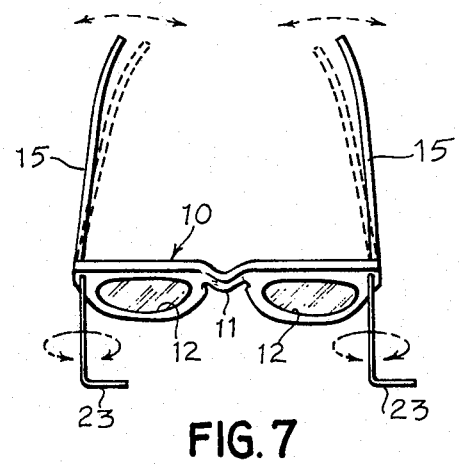

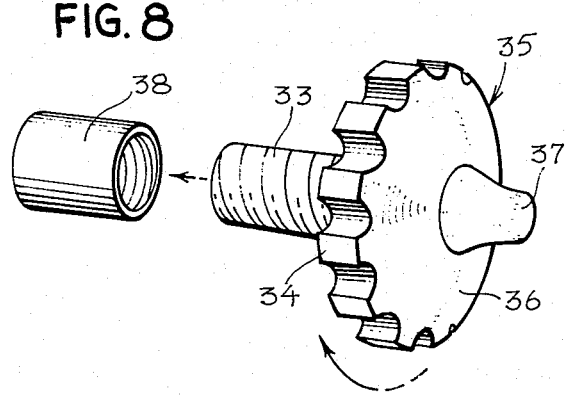
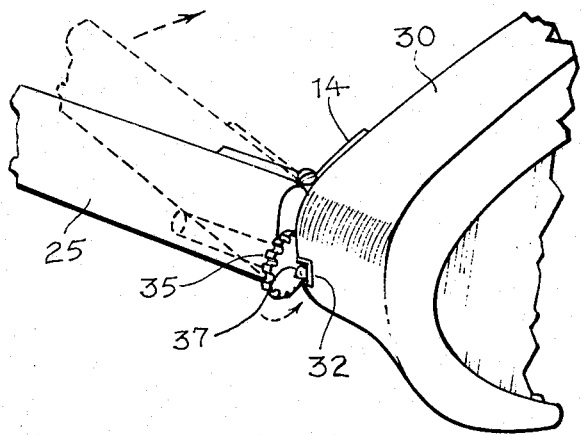
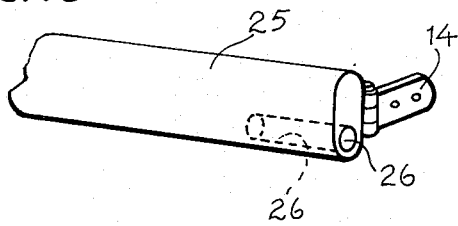
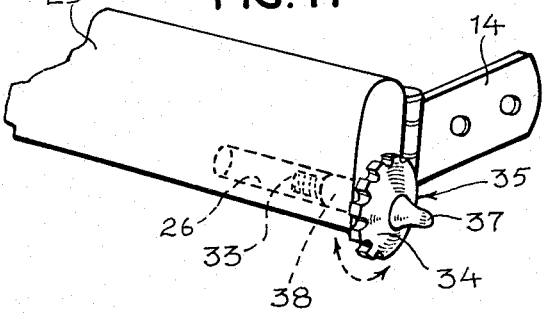
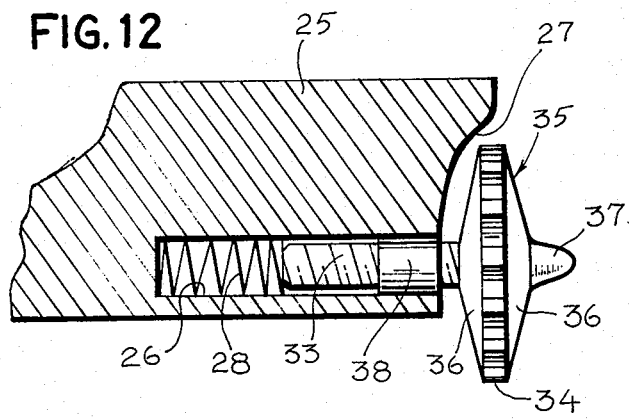
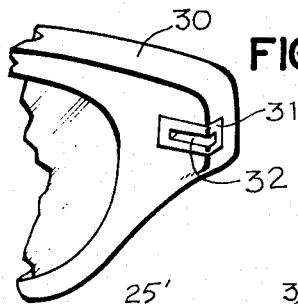
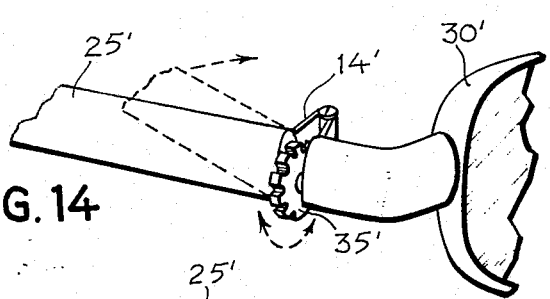
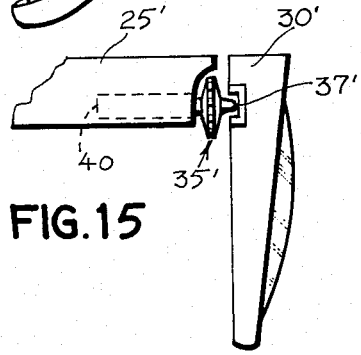
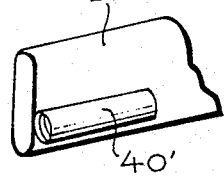
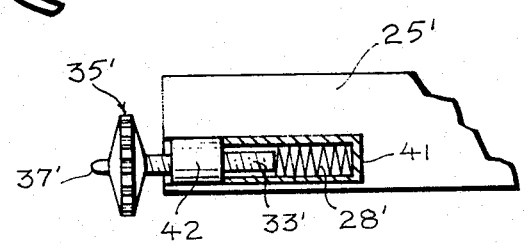

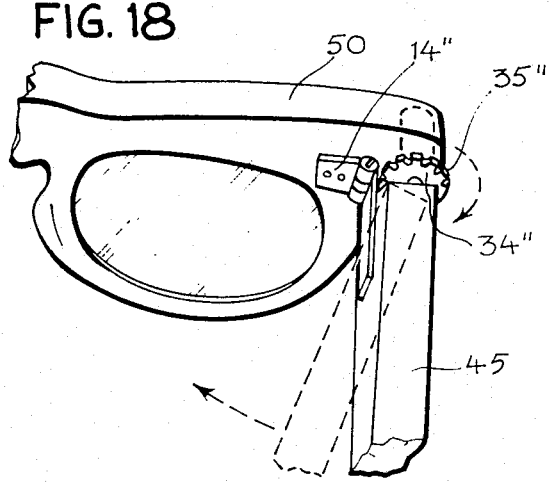
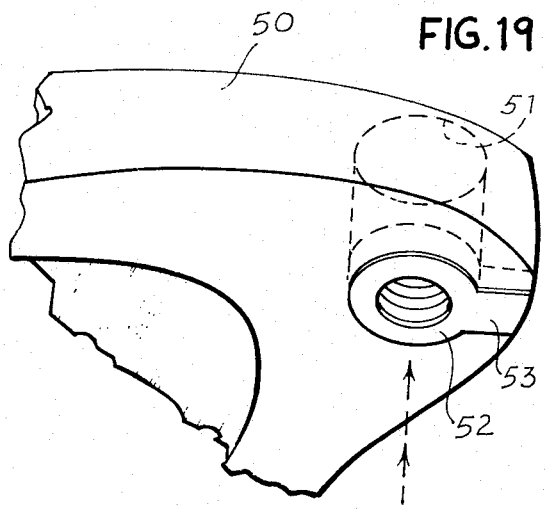
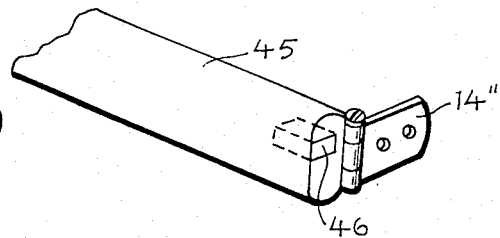
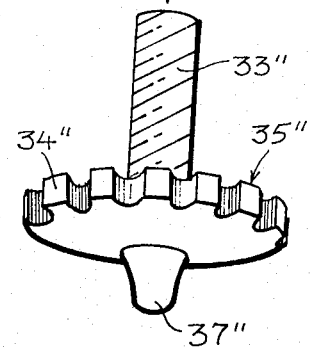
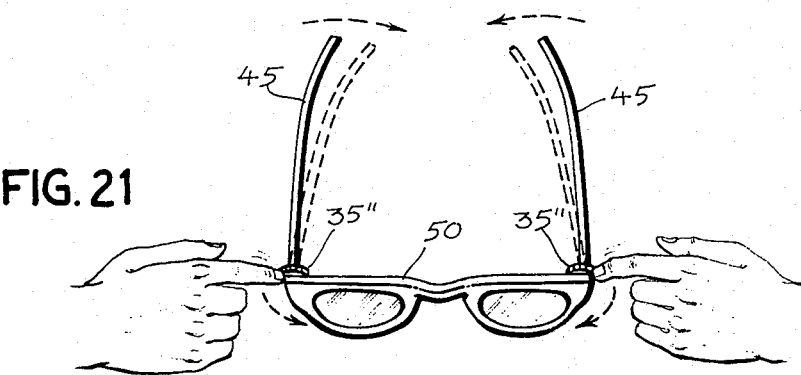
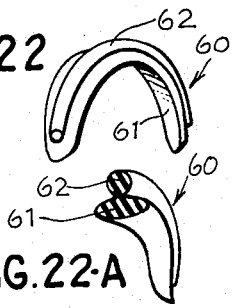
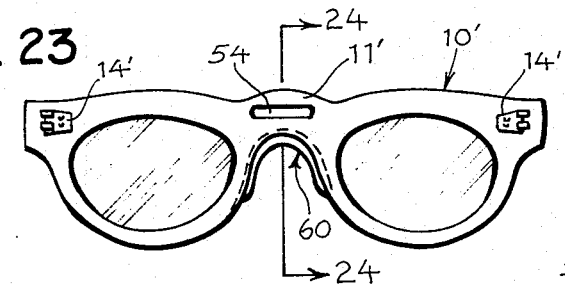
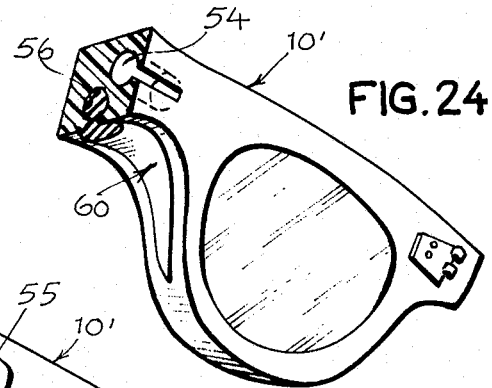
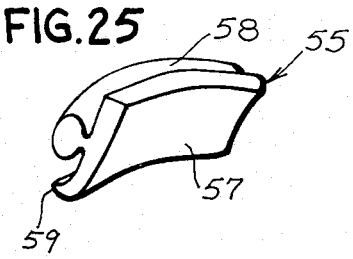
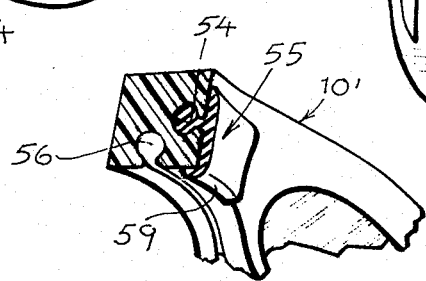

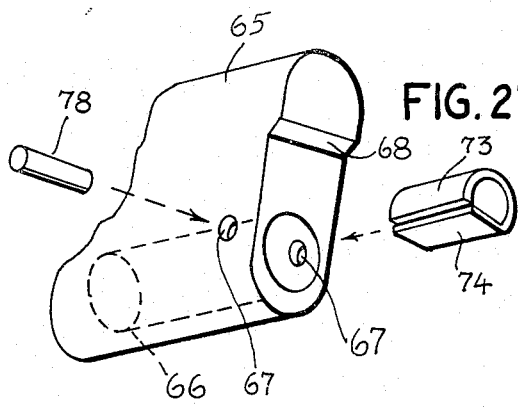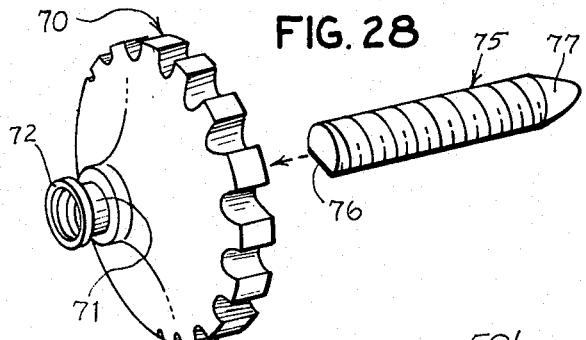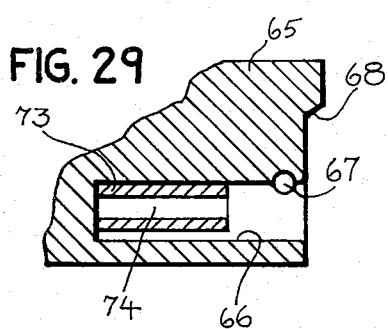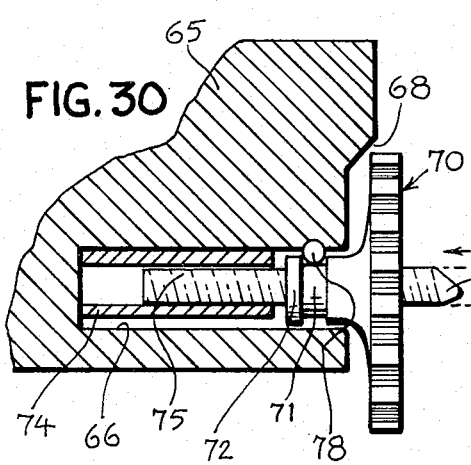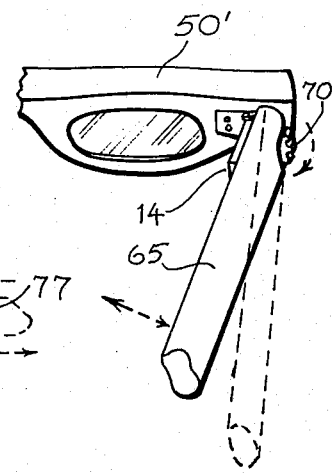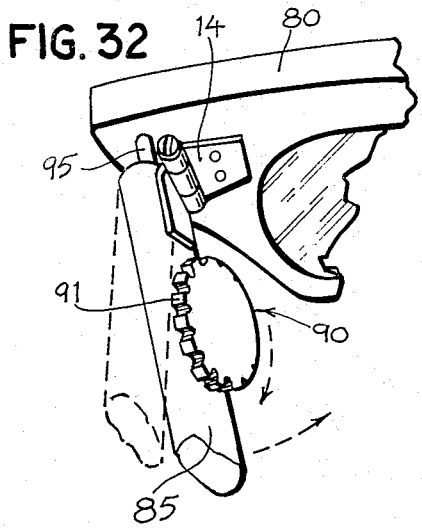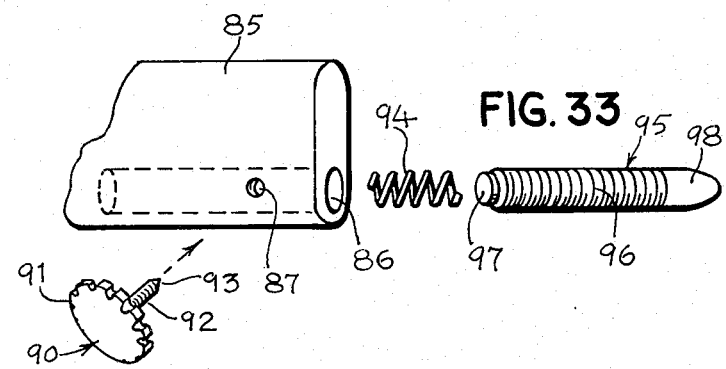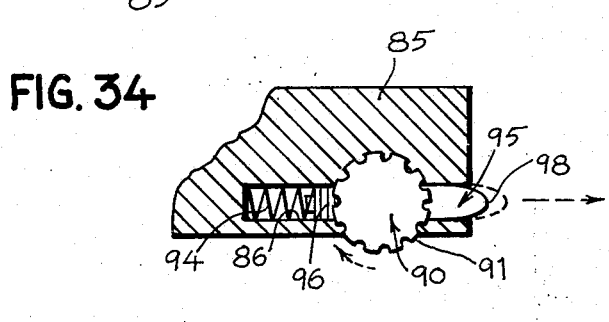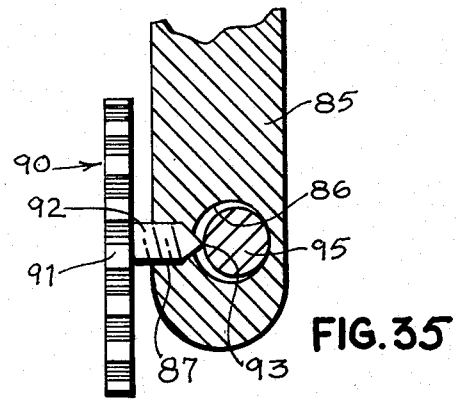

SPECTACLE FRAME WITH TEMPLES ANGULARLY ADJUSTABLE WHILE SPECTACLE FRAME IS WORN ON HEAD

FIELD AND BACKGROUND OF THE INVENTION

This invention relates to spectacle frames and, more particularly, to a novel and improved spectacle frame in which the pressure of the temples against the head can be readily adjusted and set through adjustment means which are accessible externally by the wearer of the spectacle frame while the latter is being worn on the head.

Current techniques for adjusting eyeglasses to fit properly on the head usually involve bending of the temples, as by bending metal temples or by first heating and then bending plastic temples. It is very difficult, using present techniques, to adjust the temples so that the two temples exert equal pressures against the head while being sufficiently tight to prevent the spectacle frames from slipping down the user's nose so that the lenses are no longer centered on the user's eyes. The result of the poor fit, using present techniques, is to put both lenses out of their intended focus, with resultant eyestrain due to the fact that one lens may be closer to the eye than the other lens.

The poor fit of eyeglasses or spectacles is due to several factors. Plastic frontal lens supports and temples are deliberately made of a plastic that is readily softened by heat, in order to enable the optometrist to bend the temples so as to align a "tight" and "comfortable" fit for the patient. Unfortunately, inasmuch as the plastic is affected by the heat, the heat of the patient's own head soon softens the plastic at that point that touches the head, and the heat softened area is soon bent flat again. Thus, the optometrist's adjustment by bending of the temples needs new adjustments and a return trip to the optometrist for readjustment is required.

In the case of metal frames that are not affected by heat, the same poor fit is the end result of the optometrist's required bending technique. That is, because the temples must wrap somewhat around the head in order to fit without falling or slipping down the nose, the temples and frames, in general, must have some flexibility in order for the user to open the bent temples so as to position or remove the bent, adjusted frames onto or from the head. However, any metal that would be sufficiently flexible so as to retain its configuration against maladjustment and hug the head properly would also be too unmalleable to permit the required bending therein in order to produce the correct individual fit that each patient needs. Consequently, in order to enable the fitting adjustments, some malleability is required. However, to acquire some malleability, for bending purposes, some degree of flexibility is sacrificed, and the result is the same as with the plastic frames mentioned above. Neither the metal nor plastic frames used retain their adjustments made by bending thereof during fitting.

In both cases, the frames are bent in and out of adjustment. In the plastic, the heat of the patient's head as well as the mal-bending that occurs with the removal of the heated frame from the head, upsets the adjustment. The malleable metal frames are also easily bent out of adjustment because the required flexibility needed to prevent malformation due to patient's handling does not exist in the metal frames. These are malleable so that the optometrist is able to bend and thus adjust them to the fit he needs to make to the patient's head. Unfortunately, this built-in malleability also permits the patient soon to bend the temples and frames out of adjustment each time he carelessly removes or replaces his eyeglasses. He simply bends the malleable frame and temples out of adjustment and a readjustment trip back to the optometrist is required.

The patient suffers discomfort and poor vision resulting from poorly fitted, out-of-adjustment, frames, and these discomforts often result in headaches and irritability. The patient seldom even knows why. He accepts the poorly fitted frames as an unpleasant fact of life that is not easily remedied. The optometrists also suffer with an inadequate means for making very accurate adjustments, with the hit and miss method of a bending procedure for which much skill is required even in order to do the inadequate job of bending, in order to acquire some degree of fit for the patient. Even if the optometrist comes close to getting a "good" bend that brings about a fair fit, most patients will put the frames out of adjustment with the "heat and bend" treatment the patient gives to the frames with everyday handling of the adjusted frames. The result soon brings the patient back to the optometrist for "adjustment" until the patient resigns himself to the poor fit and suffers with the poor fit.

SUMMARY OF THE INVENTION

The objective of the invention is to provide an eyeglass or spectacle frame in which the pressure of the temples against the head can be readily and easily adjusted and set by the wearer, by externally accessible adjustment means, while the frame is being worn on the head. With normal use, the easy, accurate and delicate adjustment will be maintained against maladjustment, as only deliberate abuse or readjustment will change the fit, for example, the optometrist makes on the patient's first fitting. Furthermore, the adjustment can be made by the person actually wearing the eyeglass or spectacle frame to his own liking and comfort.

The frame material, including the temples, may have such characteristics of rigidity that, even with some abuse, neither the frontal lens support nor the temples will bend from their adjustment. As some flexibility is required in the lens support and in the temples, and inasmuch as the frame of the invention employs a relatively rigid frame structure, a spring device is incorporated to afford the needed flexibility in order to enable the user to comfortably place the frame on the head and to remove it from the head. The adjustment means of the present invention does not rely upon bending of the temples, and thus does not rely on the application of heat or the malleability of the temples in order to make and set such previously unprecedented and extremely accurate adjustments that will remain fixed during normal and even abusive every day use of the eyeglass or spectacle frame.

An object of the invention is to provide an improved eyeglass or spectacle frame.

Another object of the invention is to provide such a frame incorporating adjustment means, accessible externally of the frame while the frame is being worn on the head, operable by the wearer to adjust the temples angularly about their hinges to adjust the pressure of the temples against the head.

A further object of the invention is to provide such a frame having a comfortable, conforming fit on the head and resistant to slipping down along the nose.

Another object of the invention is to provide such a frame having cushioning means interposed between the frame and the wearer's nose.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a perspective view of an eyeglass or spectacle frame embodying the invention;

FIG. 2 is a perspective view of the temple adjustment means and an associated leaf spring of the frame shown in FIG. 1;

FIG. 3 is a fragmentary perspective view illustrating a portion of the temple and the frontal lens support, as shown in FIG. 1, illustrating, to a larger scale, the temple adjusting mechanism and an associated Allen wrench;

FIG. 4 is a downward perspective view of the patient's head when wearing an eyeglass or spectacle frame that fit with the desired alignment with the eyes as well as remaining saddled to the bridge of the patient's nose;

FIG. 5 is a view similar to FIG. 4 but illustrating the frame as out of adjustment by virtue of sliding down the nose and by virtue of one lens being closer to the associated eye than is the other lens;

FIG. 6 is a three quarter view of a patient wearing an eyeglass or spectacle frame embodying the invention; and illustrating the adjustment wrench;

FIG. 7 is a plan view of a spectacle or eyeglass frame embodying the invention illustrating the adjustment procedure;

FIG. 8 is a perspective view of another embodiment of the adjustment means;

FIG. 9 is a fragmentary perspective view illustrating the adjustment means of FIG. 8 as incorporated in an eyeglass or spectacle frame;

FIG. 10 is a partial perspective view illustrating a temple and its hinge, with the temple formed with a bore for receiving an internally threaded sleeve;

FIG. 11 is a view similar to FIG. 10 but illustrating the adjusting member threaded into the sleeve;

FIG. 12 is a partial longitudinal sectional view of a temple with the adjusting device of FIG. 8 incorporated therein;

FIG. 13 is a partial perspective view of the frontal lens support illustrating the bearing for the adjusting device;

FIG. 14 is a partial perspective view of a spectacle or eyeglass frame embodying the invention, and in which the frame is made of metal;

FIG. 15 is a partial side elevation view of an eyeglass or spectacle frame embodying the invention;

FIG. 16 is a partial side elevation view of the temple shown in FIG. 14;

FIG. 17 is a side elevation view, partly in section, illustrating the adjusting device as incorporated in the temple shown in FIG. 16;

FIG. 18 is a fragmentary perspective view illustrating a modification of the adjusting means shown in FIG. 8 in which the adjusting member is threaded into the frontal lens support rather than into the temple;

FIG. 19 is an exploded partial perspective view showing this modification to a larger scale;

FIG. 20 is a perspective view of a temple showing the bearing member therein for engagement with the head of the thumbscrew;

FIG. 21 is a plan view illustrating the operation of adjusting the temples;

FIGS. 22 and 22A are, respectively, a perspective view and a sectioned partial perspective view illustrating a cushioning insert for the nose bridge of a frontal lens support;

FIG. 23 is an inside elevation view of a lens support showing the cushioning insert;

FIG. 24 is a sectioned perspective view taken on the line 24—24 of FIG. 23 with the cushion of FIGS. 22—22-A inserted therein;

FIG. 25 is a perspective view of another cushioning member;

FIG. 26 is a view similar to FIG. 24 illustrating the cushioning member of FIG. 25 as mounted in the lens support;

FIG. 27 is an exploded perspective view of a temple and a stamped member for insertion into a bore therein, forming part of a further embodiment of the adjusting means;

FIG. 28 is an exploded perspective view of the threadedly engaged members of this further embodiment of the adjusting means;

FIG. 29 is a longitudinal sectional view of the temple showing the insert in place;

FIG. 30 is a view similar to FIG. 29 but showing the parts all assembled in the temple;

FIG. 31 is a partial perspective view illustrating the adjustment of the temple using the adjustment means of FIGS. 27 through 30;

FIG. 32 is a perspective view illustrating yet another form of adjusting device;

FIG. 33 is an exploded perspective view of the adjusting device shown in FIG. 32;

FIG. 34 is a longitudinal sectional view illustrating the adjusting device shown in FIGS. 32 and 33; and FIG. 35 is a transverse sectional view corresponding to FIG. 34.

DESCRIPTION OF THE PREFERRED EMBODIMENTS

Referring first to FIGS. 1 through 7, an eyeglass or spectacle frame embodying the invention is illustrated as comprising a frontal lens support 10 and a pair of temples 15 secured to respective opposite ends of lens support 10 by hinges 14. Lens support 10 includes a nose bridge 11 interconnecting lens framing members or openings 12. For a purpose to be described, threaded apertures 13 extend through lens support 10 at each end thereof.

A leaf spring member 16, having a bent leaf spring end 17, is interposed between each hinge member 14 and the temple 15 to which the hinge is connected. For this purpose, leaf spring member 16 may be formed with holes 18 through which there extend the screws 24 securing the hinge 14 to temple 16. It will be noted that bent leaf spring end 17 extends at an obtuse angle with respect to the other portion of member 17. A threaded stud 20 is threaded through each aperture 13, and has a narrow tip end 21 engageable with bent leaf spring end 17, the opposite end of each stud 20 being formed with a polygonal socket 22 to receive an Allen-type wrench 23. By adjusting stud 20, using an Allen wrench 23, the angle formed between lens support 10 and each temple 16 can be suitably adjusted and remain as set. The studs at opposite sides of the lens support preferably are threaded in respective opposite directions.

FIG. 4 illustrates a spectacle frame, having a lens support 10 and temples 15, when ideally adjusted for mounting on the head of a user, whereas FIG. 5 illustrates a maladjusted eyeglass or spectacle frame in which the lens opening for the right eye is closer to the right eye than is the lens opening for the left eye, the left temple 15 extending at a larger angle to lens support 10 than does the right temple 15. Such maladjustment can be corrected, with the spectacle or eyeglass frame of the present invention, in the manner illustrated in FIGS. 6 and 7 and with the lens frame mounted on the head. All that is necessary is for the optometrist, or even the wearer of the spectacle or eyeglass frame, to insert an Allen wrench 23 into the socket 22 of each stud 20 and to adjust the studs until the temples 15 bear with equal pressure against the user's head. It will be noted that the adjusting means is accessible externally of the spectacle frame, by the wearer, while the spectacle frame is being worn on the head, and the adjustment means are interengaged between each temple and the lens support and operable to adjust the temple angularly about the axis of the associated hinge to adjust the pressure of the temple against the head.

The provision of the leaf spring 16, 17 provides for spreading the temples 15 when removing the spectacle frame from the head or when replacing the spectacle frame on the head.

In the embodiment of the invention shown in FIGS. 8 through 13, the spectacle or eyeglass frame again includes a pair of temples 25 connected to respective opposite ends of a lens support 30 by hinges 14, although only one temple 25 has been shown in these figures. In this embodiment, no tools are required for the adjustment and setting. The adjustment means, in this embodiment of the invention, comprises a one-finger operable thumbscrew 35 having a threaded stem 33 and a sharply knurled head 34. The ribs of the knurled head have right angle, non-chamfered edges and are spaced apart a distance of the order of 0.050 inch and the grooves therebetween have a depth of 0.015 to 0.020 inch. The circumferential width of the ribs is of the order of 0.012 to 0.020 inch. The overall diameter of each head 34 is of the order of 0.190 to 0.210 inch. Each head 34 projects outwardly of the associated temple 25 a distance of the order of at least 0.15 to 0.20 inch, to enable one finger operation. The axial dimension of head 34 is 0.050 to 0.060 inch, and the axial length of the ribs is of the order of 0.012 to 0.020 inch with a depth of about 0.20 to 0.25 inch. Tip 37 has a diameter of about 0.060 to 0.070 inch, and its smooth head has a radius of about 0.030 inch. The opposite faces of head 34 are bevelled or tapered as indicated at 36, and a tip 37 projects from that surface of head 34 opposite to the surface from which threaded stems 33 extends. The stem 33 on opposite sides of the lens support are threaded in respective opposite directions so that, by rotating both heads 34 "downwardly," for example, both temples are tightened against the head, for example, or vice versa.

Each temple 25 is formed with a longitudinal bore 26 in which there is seated a spring 28 and an internally threaded sleeve 38, which is cemented into bore 26. Either sleeve 38 is made very short or otherwise it has only a very short threaded portion, namely its outer end portion, with the inner end portion having a clearance with stem 33 of thumbscrew 35. The relatively short threaded interengagement between threaded stem 33 and internally threaded sleeve 38 greatly reduces the friction between these two parts during adjustment of the temples relative to the lens support. Spring 28, which engages the inner end of threaded stem 33, serves to frictionally lock stem 33 in its adjusted position. It will be noted, particularly from FIG. 12, that the end of temple 25 adjacent hinge 14 is bevelled or undercut as indicated at 27 to accommodate the head 34 of thumbscrew 35.

The particularly small diameter and chamfered tip 37 of head 34 of thumbscrew 35 bears and rotates against an end of lens support 30 with the least amount of friction due to its small diameter and chamfer. For this purpose, lens support 30 is formed with a bearing insert 31 which has a longitudinal slot 32 extending laterally of lens support 30. This assures maintenance of proper alignment of each temple 25 with the lens support 30 during adjustment of the temple. As tip 37 engages lens support 30 eccentrically with respect to the hinge axis of hinge 14, during turning in and out of thumbscrew 35 with one finger, tip 37 and temple 25 will move relatively in an arc in a horizontal plane. The provision of bearing member 31 with its slot 32 accommodates this movement while maintaining proper alignment between each temple 25 and the lens support 30. While head 34 of thumbscrew 35 is illustrated as projecting downwardly from the associated temple 25, it could equally well project upwardly therefrom or even project laterally outwardly therefrom, depending on the choice of a manufacturer. In such cases, bore 26 and bearing member 31 would be appropriately located.

FIGS. 14 through 17 illustrate a metal spectacle or eyeglass frame incorporating the adjustment means 35–38 of FIGS. 8 through 13, and the same reference characters primed have been used to designate corresonding or like parts. There is again a lens support 30' connected by hinges 14' to temples 25'. As it is not possible to provide a bore, such as the bore 26 of FIGS. 8 through 13, the threaded sleeve is formed as a tubular sleeve 40 which is soldered, brazed, welded, or the like to the inner surface of a temple 25'. Sleeve 40 has a closed inner end 41 seating the spring 28', and its outer end has a threaded portion indicated at 42. The construction otherwise is the same as described in connection with FIGS. 8 through 13.

In the embodiment of the invention shown in FIGS. 18 through 21, the position of the one finger operable thumbscrew is relatively reversed to that the tip of its head bears against a temple and its stem is threaded into the lens support. Referring to these figures, the spectacle or eyeglass frame again includes a lens support 50 to which a pair of temples 45 are hingedly interconnected by hinges 14". Each end of lens support 50 is formed with a bore, such as 51, which has a radial extension, and a threaded insert 52 is seated in this bore and has a radial extension 53 preventing its rotation. It will be noted that the insert 52 is adjacent the upper edge or side of lens support 50. Correspondingly, each temple 45 has a bearing block 46 inserted into a rectangular recess therein adjacent its upper edge.

The thumbscrew 35'' is essentially the same as the thumbscrews 35 and 35'. Stem 33'' of thumbscrew 35'' is threaded into insert 52, and knurled operating head 34'', in this case, projects above the upper and outer edges of the eyeglass or spectacle frame. The tip 37'' is aligned with the bearing block 46 so that it bears against this bearing block during adjustment of each temple relative to the lens support 50. FIG. 21 illustrates how the temples 45 may be angularly adjusted with the spectacle or eyeglass frame in position on the head, by using the fingers to manipulate the thumbscrew 35''. Other than this, the arrangement operates in the same manner as in the arrangements of FIGS. 8 through 17.

The desired end result of properly adjusting a spectacle or eyeglass frame, with respect to the wearer's head, is total comfort and with the lenses in the proper relationship to the wearer's eyes, in wearing the spectacles or eyeglasses. While such total comfort can be attained to a very large extent by the temple adjustment means of the present invention, it can be further improved by the provision of means for "floating" the frames onto the head in combination with the temple adjustment means. For this purpose, and as shown in FIGS. 22 through 26, the nose bridge 11' of a lens support 10' having hinges 14' for connection to a pair of temples is formed with grooved slots to receive foam rubber inserts constituting disposable nose bridge cushions. One of these slots is indicated at 54 as having a keyhole shape cross-section and as extending longitudinally of the inner surface of nose bridge 11', and the other slot is indicated at 56 as also having a keyhole shape and extending longitudinally of the curved undersurface of nose bridge 11'.

Slot 54 is arranged to receive a foam rubber cushion member 55, best seen in FIG. 25 as comprising a curved cushion portion 57 from which there extends a rib 58 which has a keyhole shape cross-section adapted to be snapped into the slot 54. The cushion portion 57 has a cushion lip 59 supporting the weight of bridge 11 on the wearer's nose. The curved slot 56 is arranged to receive a correspondingly curved cushion member 60, of foam rubber or the like, having a cushion portion 61 and a rib 62 which has a keyhole cross-section corresponding to that of the slot 56. Cushion member 60, which is curved longitudinally as best seen in FIGS. 22 and 22A, is arranged to be snapped into the groove 56.

The area to be cushioned under pressure actually is a single area, but the direction of the pressure is multidirectional. Thus, the provision of the two cushions 55 and 60 effects the cushioning in the two different directions. In the case where no such cushioning is employed, the entire weight of the eyeglass or spectacle frame bears against the bridge of the nose. As eyeglass nose bridges do not generally match the contours of the wearer's nose, then the non-corresponding surfaces of such nose bridges project into the wearer's nose and the support of the entire frame is on the few high points of these non-corresponding surfaces or irregularities which, in turn, dig into the wearer's nose. Without cushioning, the wearer's nose gives in to the pressure of the rigid eyeglass frame nose bridge and, with such pressure, pain or discomfort or both result. With cushioning as provided in the present invention, the cushioning absorbs the pressure on the nose without pain or discomfort to the nose. Thus, when the cushions 55 and 60 are compressed, to match the overall contours of the nose bridge, the weight is distributed evenly over the entire nose bridge. Furthermore, cushioning provides a levelling of the mis-matched contours of the rigid nose bridges of the frame to the wearer's nose, resulting in a loss of consciousness of the weight of the frame. Only a sensation of "comfortable floating" remains, without any pain or discomfort.

FIGS. 27 through 31 illustrate an embodiment of the invention wherein a rotatable internally threaded head is fixed against axial movement while being threadedly engaged with a threaded plunger which is axially movable but fixed against rotation. Referring to FIGS. 27 through 31, a temple 65 is formed with a longitudinal bore 66 and with a circumferential recess 67 in bore 66. In the same manner as previously described, the end of temple 65 secured by a hinge 14 to a lens support 50' is formed with a bevel 68. This allows rotation of the adjusting member, such as a knurled one finger operated knob 70 internally threaded for engagement with a threaded plunger or shaft 75.

A stamped and formed sleeve 73 is formed with a flattened side 74. When sleeve 73 is inserted into bore 66, it has a tight frictional fit therein. Threaded plunger or shaft 75 is formed with a flat side 76 and with a small rounded end 77. Shaft or plunger 75 is conformingly engageable in sleeve 73 for sliding movement relative thereto while being restrained against rotation by sleeve 73. Knurled knob 70, which is internally threaded for threaded engagement with shaft 75, has an annular groove 71 defined partly by a collar or flange 72 at its outer end.

In assembling the adjusting means shown in FIGS. 27 through 31, stamped sleeve member 73 is inserted into bore 66 with a tight frictional fit therein. After this, knurled kob 70 is telescoped into bore 66 of temple 65 and with annular groove 71 of knob 70 aligned with hole 67. Then the assembly of knob 70 is completed by inserting a spring pin or the like 78 through the hole 67 as well as along groove 71 so that knob 70 is retained against axial displacement relative to temple 65 while being rotatable. Shaft 75 is then threaded into knob 70 by rotation of knob 70, and continued rotation of knob 70 will draw shaft 75 into flattened sleeve insert 74, so that shaft or plunger 75 is thereby retained against rotation while being axially displaceable. The assembled parts are shown more particularly in FIG. 30.

The adjustment of temple 65 relative to lens support 50' is illustrated in FIG. 31. With the eyeglass or spectacle frame mounted on the head, the user rotates knob 70 with his finger tip which advances or retracts plunger 75, whose small chamfered end 77 is engaged with an end of lens support 50', until temple 65 has a confortable fit against the head. It will be noted that knob 70 is rotatable but is not advanced or retracted relative to temple 65, while plunger 75 is non-rotatable and is advanced and retracted relative to temple 65.

A further embodiment of the adjusting means is shown in FIGS. 32 – 35. In this case, a lens support 80 is again connected to a pair of temples 85 by the hinges 14. Each temple 85 is formed with a longitudinally extending bore 86, and a threaded hole 87 radially intersects bore 86.

A compression coil spring 94 is seated at the inner end of bore 86, and engages a spring seat 97 on the inner end of a plunger 95 formed with threads or ribs 96 and with a small chamfered point on its outer end 98. A thumbscrew 90 has a knurled head 91 and a threaded stem 92 formed with a point 93. Thumbscrew 90 is threaded into threaded hole 87, so that its pointed end 93 may engage the threads or ribs 96 of plunger 95.

A person wearing the spectacle or eyeglass frame adjusts the temples relative to his head in the following manner. When the wearer desires a tighter hugging of the temples against his head, he first loosens thumbscrew 90 by rotating head 91 with his thumb. The wearer then presses temple 65 against the sides of his head, which releases plunger 95 loaded by spring 94, so that plunger 95 has its pointed end 98 bearing against the end of lens support 80. The wearer then rotates knurled head 91 to tighten thumbscrew 90 with its point 93 engaged with the threads 96 of plunger 95. This provides a correct and firm fit against slippage. As is the case with all of the adjustment means described above, no skill or special adjusting knowledge is required to make the adjustment for desirable and comfortable fit of the temples which keeps the eyeglass or spectacle frames from slipping down the wearer's nose as in conventional frames, and no tools are required. Only the wearer's sense of comfort is needed and he adjusts accordingly.

While spring-loaded plungers have been employed before, none ever afforded the wearer of a spectacle or eyeglass frame any control over the exact degree of tightness and fit of the temples. In the prior art arrangements, the spring-loaded device merely tried to create enough tension or pressure, through the use of a spring, to keep the frames tight. However, the opposite effect occurred. The spring, due to its small size, is limited in the pressure it can develop against the wearer's head, with the result that the frame slipped down the wearer's nose as the light spring gives way frequently, as from the pressure of the hair on the wearer's head. As each wearer will tolerate a different degree of tightness in order to be comfortable and also to prevent slippage, a standard spring pressure device thus cannot afford the wide range of needs to accommodate the various needs of all wearers in one common degree of pressure of the spring-loaded device. Even the amount of hair on the individual wearer's head will diminish or increase the spring pressure on the wearer's head, and thus its ability to afford comfort and stability on the head for the spectacle or eyeglass frame. Furthermore, the variation in head width also affects the spring tension.

As the amount of pressure of the temples against the head is directly responsible for slippage control and comfort, and inasmuch as the amount of this pressure will vary from wearer to wearer, no standard amount of pressure will afford fit and comfort for all wearers. Only a controllable device, that is adjustable by the wearer while wearing the eyeglass or spectacle frame, to suit his own comfort and non-slipping needs, will provide universality of fit no matter who is wearing the eyeglass or spectacle frame just as long as the wearer can make his own adjustment to match his own comfort and "feel" a fit to his own head and while he is actually wearing the spectacle or eyeglass frame. With all embodiments, except that shown in FIGS. 1 – 7, no tool is necessary and only a finger operation is required.

As the degree of tightness of the temples to the head is so significant to comfort, only the wearer can best say what is too much pressure. The optometrist can only guess at what that pressure is and, worse yet, he only has a bending means to accomplish the change in pressure by bending the temples toward the head. Overbending results in too much head pressure and discomfort, and underpressure results in a loose fit which causes pain to the nose as the frame slips down the nose and digs into the skin where the nose widens. Thus, it should be clear that spring-loaded plungers or hinges, or hand bent temples, do not offer the wearer the opportunity to adjust the fit to his comfort, as only he know it to be. The optometrist can merely guess, while the patient knows what degree of tightness equals comfort and simultaneously affords the tension needed against his head to prevent slippage. While excessive tightness will assure non-slippage, the wearer cannot tolerate such excesses, with the result that he settles for the loose fit that slips down his nose. The tension may be neither tight nor loose.

These disadvantages apply also to adjustable frames where it is necessary to remove the frames from the head in order to effect the adjustment, as the sense of feel by the patient wearing the frames during adjustment does not exist during the adjustment.

While specific embodiments of the invention have been shown and described in detail to illustrate the application of the principles of the invention, it will be understood that the invention may be embodied otherwise without departing from such principles.

What is claimed is:

1. A spectacle frame comprising, in combination, a frontal lens support including a nose bridge; a pair of temples; respective hinges connecting each temple to a respective outer end of said lens support; and adjustment means, accessible externally of said spectacle frame while said spectacle frame is being worn on the head, interengaged between at least one temple and said lens support and operable to adjust and set the temple angularly about the axis of the associated hinge to adjust the pressure of the temple against the wearer's head; said adjustment means comprising a threaded member threadedly engaged in said lens support and having an end operatively engaged with said temple at a point spaced from the axis of the associated hinge; and an operating member, accessible from the front surface of said lens support while said spectacle frame is being worn on the head, operable to advance and retract said threaded member relative to said lens support.

2. A spectacle frame, as claimed in claim 1, in which there are two said threaded members, one adjacent each respective hinge; said threaded members being threaded in respective opposite directions.

3. A spectacle frame, as claimed in claim 1, in which each hinge includes means forming a leaf spring extending outwardly across that end of the associated temple to which the hinge is secured; each threaded member comprising a screw threaded through an aperture through the adjacent end of said lens support and having an inner end engaged with the associated leaf spring; each threaded member having an outer end, accessible from the front surface of said lens support, formed for engagement by a screw driving tool.

4. A spectacle frame, as claimed in claim 1, in which the knurled periphery of said thumbscrew head comprises widely circumferentially spaced ribs having right angle, non-chamfered edges, said ribs being spaced apart a distance of the order of 0.050 inches.

5. A spectacle frame, as claimed in claim 4, in which said knurled operating head has axially opposite end surfaces which are beveled to a substantially frustoconical shape; the overall axial dimension of said knurled operating head being from three to five times the length of said ribs in the axial direction of said head.

6. A spectacle frame, as claimed in claim 1, including an internally threadedelement secured to said one of said lens support and said temple, the threaded stem of said thumbscrew being threadedly engaged in said internally threaded element.

7. A spectacle frame, as claimed in claim 6, in which said internally threaded element is a threaded sleeve, each threaded sleeve being secured to a respective temple to extend longitudinally thereof.

8. A spectacle frame, as claimd in claim 7, including a respective coil spring in each sleeve engageable with the end of the threaded stem of said thumbscrew to restrain inadvertent rotation of said thumbscrew.

9. A spectacle frame, as claimed in claim 8, in which said lens support and said temples are formed of plastic composition material; each sleeve being inserted in a bore of a respective temple.

10. A spectacle frame, as claimed in claim 8, in which said lens support and said temples are formed of metal; each sleeve being secured to the inner surface of a respective temple.

11. A spectacle frame, as claimed in claim 9, including bearing blocks at the opposite ends of said lens support engageable by the tips of said thumbscrews; each bearing block having a groove extending longitudinally of said lens support and in which the tip of a respective thumbscrew in engaged.

12. A spectacle frame, as claimed in claim 6, including a pair of internally threaded inserts each nonrotatably inserted in the rear surface of said lens support adjacent a respective opposite end thereof, and each threadedly engaged with the stem of a respective thumbscrew; and a pair of bearing blocks each inserted in the inner end of a respective temple and engageable by the tip of a respective thumbscrew.

13. A spectacle frame, as claimed in claim 11, in which each sleeve has a flattened side; each plunger having a flattened side engageable with the flattened side of the associated sleeve; and a respective pin inserted into a transverse hole intersecting each bore and engageable in an annular groove in the associated knurled knob to restrain the associated knurled knob against axial displacement while providing for rotation thereof.

14. A spectacle frame, as claimed in claim 4, in which the ribs of said sharply knurled thumbscrew are spaced sufficiently so that, when said thumbscrew is rotated with one finger, the widely circumferentially spaced knurls permit the flesh of the finger to be pressed into and engaged in the spaces between the sharp knurls with the edges of the sharp knurls being thereby imbedded in the flesh of the finger somewhat for the positive contact required to rotate said sharply knurled thumbscrew against resistance to its rotation.

15. A spectacle frame comprising, in combination, a frontal lens support including a nose bridge; a pair of temples; respective hinges connecting each temple to a respective outer end of said lens support; and adjustment means, accessible externally of said spectacle frame while said spectacle frame is being worn on the head, interengaged between at least one temple and said lens support and operable to adjust and set the temple angularly about the axis of the associated hinge to adjust the pressure of the temple against the wearer's head; said adjustment means comprising a threaded member threadedly engaged in one of said lens support and said temple and having an end operatively engaged with the other of said lens support and said temple at a point spaced from the axis of the associated hinge; and an operating member, accessible externally of said spectacle frame while said spectacle frame is being worn on the head, operable to advance and retract said threaded member relative to said one of said lens support and said temple; said threaded member comprising a thumbscrew having a knurled operating head, a threaded stem extending from one side of said head and threadedly engaged in said one of said lens support and said temple, and a tip extending from the opposite side of said head and engageable with the other of said lens support and said head; the knurled periphery of said thumbscrew head projecting externally of said spectacle frame for single fingertip operation of said adjustment means while said spectacle frame is being worn on the head.

16. A spectacle frame comprising, in combination, a frontal lens support including a nose bridge; a pair of temples; respective hinges connecting each temple to a respective outer end of said lens support; and adjustment means, accessible externally of said spectacle frame while said spectacle frame is being worn on the head, interengaged between at least one temple and said lens support and operable to adjust and set the temple angularly about the axis of the associated hinge to adjust the pressure of the temple against the wearer's head; said adjustment means comprising a threaded member threadedly engaged in one of said lens support and said temple and having an end operatively engaged with the other of said lens support and said temple at a point spaced from the axis of the associated hinge; and an operating member, accessible externally of said spectacle frame while said spectacle frame is being worn on the head, operable to advance and retract said threaded member relative to said one of said lens support and said temple; each temple being formed with a respective longitudinal bore; a respective sleeve fixedly secured in each bore; each threaded member comprising an externally threaded plunger inserted into a respective sleeve and restrained by the sleeve against rotation while being axially movable relative to the associated sleeve; a respective internally threaded knurled head having a portion seated in each bore and retained therein against axial displacement relative to the associated bore; each knurled head being threadedly engaged with an associated threaded plunger and having a peripheral rim extending outwardly of the associated temple for one finger tip rotation by a wearer of the spectacle frame while the spectacle frame is being worn on the head to advance and retract the associated plunger axially.

17. A spectacle frame comprising, in combination, a frontal lens support including a nose bridge; a pair of temples; respective hinges connecting each temple to a respective outer end of said lens support; and adjustment means, accessible externally of said spectacle frame while said spectacle frame is being worn on the head, interengaged between at least one temple and said lens support and operable to adjust and set the temple angularly about the axis of the associated hinge to adjust the pressure of the temple against the wearer's head; each temple being formed with a longitudinal bore and with a threaded lateral opening radially intersecting the bore; a respective coil spring inserted into each bore; a respective externally peripherally grooved plunger engaged in each bore and having an inner end seated against the associated spring and an outer tapered end; and a respective sharply knurled thumbscrew including a head and a pointed threaded stem threaded into each lateral opening for engagement of the pointed end with the grooves of the associated plunger; whereby, upon loosening of the associated thumbscrew, and pressing of the temples against the head while the spectacle frame is being worn, said plungers are projected by the associated springs to engage their tapered ends with the ends of said lens support and, upon tightening of the associated thumbscrew, the respective plungers are retained in their adjusted position.

18. A spectacle frame comprising, in combination, a frontal lens support including a nose bridge; a pair of temples; respective hinges connecting each temple to a respective outer end of said lens support; adjustment means, accessible at a point interspaced between a temple and said lens support of said spectacle frame while said spectacle frame is being worn on the head, and interengaged between at least one temple of said lens support and operable to adjust and set the temple angularly about the axis of the associated hinge to adjust the pressure of the temple against the wearer's head; said adjustment means comprising a threaded member threadedly engaged in one of said lens support and said temple and having an end operatively engaged with the other of said lens support and said temple at a point spaced from the axis of the associated hinge; and an operating member, accessible at a point interspaced between said temple and said lens support of said spectacle frame while said spectacle frame is being worn on the head, operable to advance and retract said threaded member relative to said one of said lens support and said temple; said threaded member comprising an operating head, a threaded stem extending from one side of said head and threadedly engaged in said one of said lens support and said temple, and a tip extending from the opposite side of said head and engageable with the other of said lens support and said temple; the periphery of said operating head being accessible at a point interspaced between said temple and said lens support of said spectacle frame for operation of said adjustment means while said spectacle frame is being worn on the head.

19. A spectacle frame comprising, in combination, a frontal lens support including a nose bridge; a pair of temples; respective hinges connecting each temple to a respective outer end of said lens support; and adjustment means, accessible at a point interspaced between a temple and said lens support of said spectacle frame, interengaged between at least one temple and said lens support and operable to adjust and set the temple angularly about the axis of the associated hinge to adjust the pressure of the temple against the wearer's head; said adjustment means comprising a threaded member threadedly engaged in said lens support and having an end operatively engaged with said temple at a point spaced from the axis of the associated hinge; and an operating member, accessible from the front surface of said lens support, operable to advance and retract said threaded member relative to said lens support.

20. A spectacle frame comprising, in combination, a frontal lens support including a nose bridge; a pair of temples; respective hinges connecting each temple at a hinge end to a respective hinge end of said lens support; adjustment means, accessible at a point interspaced between a temple hinge end and the adjacent lens support hinge end of said spectacle frame, and interengaged between at least one temple and said lens support and operable to adjust and set the temple angularly about the axis of the associated hinge to adjust the pressure of the temple against the wearer's head; said adjustment means comprising a threaded member threadedly engaged in one of said lens support and said temple and having an operating head operatively engaged with the other of said lens support and said temple at a point spaced from the axis of the associated hinge; said operating head being accessible at a point interspaced between the hinge end of said temple and said adjacent hinge end of lens support of said spectacle frame, and being operable to advance and retract said threaded member relative to said one of said lens support and said temple; said threaded member comprising said operating head and a threaded stem extending from one side of said operating head and threadedly engaged in said one of said lens support and said temple; and the opposite side of said operating head being engageable with the other of said lens support and said temple; said operating head being accessible for operation at a point interspaced between the hinge end of said temple and the adjacent hinge end of said lens support of said spectacle frame for operation of said adjustment means.

* * * * *